(12) United States Patent
Fox

(10) Patent No.: US 9,908,612 B2
(45) Date of Patent: Mar. 6, 2018

(54) FOLD WING TIP HAVING STUB SPAR

(75) Inventor: Bruce Robert Fox, Everett, WA (US)

(73) Assignee: The Boeing Company, Chicago, IL (US)

(*) Notice: Subject to any disclaimer, the term of this patent is extended or adjusted under 35 U.S.C. 154(b) by 1036 days.

(21) Appl. No.: 13/251,216

(22) Filed: Oct. 1, 2011

(65) Prior Publication Data

US 2013/0292508 A1 Nov. 7, 2013

(51) Int. Cl.
*B64C 3/56* (2006.01)
*B64C 3/42* (2006.01)

(52) U.S. Cl.
CPC .............. *B64C 3/56* (2013.01); *B64C 3/42* (2013.01); *Y02T 50/145* (2013.01)

(58) Field of Classification Search
CPC ..................................... B64C 3/56; B64C 3/18
USPC ... 244/49, 218, 39, 199.4, 124, 123.1, 123.8
See application file for complete search history.

(56) References Cited

U.S. PATENT DOCUMENTS

| | | | |
|---|---|---|---|
| 2,418,301 A * | 4/1947 | Heal | B64C 3/42 244/102 R |
| 2,572,421 A * | 10/1951 | Abel, Jr. | B64C 3/56 244/49 |
| 2,719,682 A * | 10/1955 | Handel | B64C 3/56 244/49 |
| 5,201,479 A | 4/1993 | Renzelmann | |
| 5,310,138 A * | 5/1994 | Fitzgibbon | 244/49 |
| 5,381,986 A | 1/1995 | Smith et al. | |
| 6,082,665 A * | 7/2000 | Spitzer | 244/2 |
| 9,139,285 B2 * | 9/2015 | Schlipf | B64C 3/56 |
| 2009/0302159 A1 * | 12/2009 | Pajard | 244/124 |
| 2010/0051742 A1 * | 3/2010 | Schweighart et al. | 244/49 |
| 2011/0180657 A1 * | 7/2011 | Gionta et al. | 244/49 |
| 2014/0319268 A1 * | 10/2014 | Lassen | B64C 3/56 244/49 |

FOREIGN PATENT DOCUMENTS

EP 2650212 A1 10/2013

OTHER PUBLICATIONS

Folding wing, http://en.wikipedia.org/wiki/Folding_wing.

* cited by examiner

*Primary Examiner* — Marc R Burgess
(74) *Attorney, Agent, or Firm* — Miller, Matthias & Hull LLP

(57) ABSTRACT

A wing includes a wing tip hinged to a main wing section. The wing tip includes a stub spar extending past an end of the wing tip. When the wing tip is extended, the stub spar extends into the main wing section to react a moment load across a length of the stub spar.

13 Claims, 5 Drawing Sheets

FOLD WING TIP HAVING STUB SPAR

BACKGROUND

Extending the wing length of certain commercial aircraft is extremely desirable. Long high aspect ratio wings are aerodynamically more efficient than shorter wings. However, existing airports limit the size of aircraft wing span so the aircraft can fit within their taxiways and parking areas. Some airports might not be able to accommodate aircraft having long wings.

A folding wing design may be used to reduce the span of these wings to fit within the limitations of an existing airport's infrastructure. Folding wing designs enable naval aircraft to operate from the limited deck space of aircraft carriers. Folding wings allow a naval aircraft to occupy less space in a confined aircraft carrier hangar because the folded wings normally rise over the aircraft's fuselage.

However, naval aircraft are much smaller than large commercial aircraft, and present folding wing designs for naval aircraft are optimized to different mission parameters than large commercial aircraft. Wing fold joints in naval aircraft use highly loaded hinges and locking pins acting over very small wing bending reaction moment arms.

In commercial aircraft, a folding wing design may be scaled up. High reaction loads may be overcome by increasing the size of the hinges and locking pins. However, these size increases will increase aircraft weight, and increases in aircraft weight are undesirable because operating costs such as fuel costs are increased. Consequently, the increase in weight negates the advantages offered by the long high aspect wings.

SUMMARY

According to an embodiment herein, a wing comprises a wing tip hinged to a main wing section. The wing tip includes a stub spar extending past an end of the wing tip. When the wing tip is extended, the stub spar extends into the main wing section to react a moment load across a length of the stub spar.

According to another embodiment herein, an aircraft wing tip comprises a stiffening substructure that defines a tip end; and a stub spar that extends past the tip end by a length that is greater than a distance between upper and lower surfaces of the wing tip.

According to another embodiment herein, an aircraft comprises at least one folding structure that is foldable between an extended position and a folded position. Each folding structure includes a first section hinged to a second section. The first section includes a stub spar extending past an end of the first section. When the first section is extended, the stub spar extends into the second section to react a moment load across a length of the stub spar.

DETAILED DESCRIPTION

Figure 1:
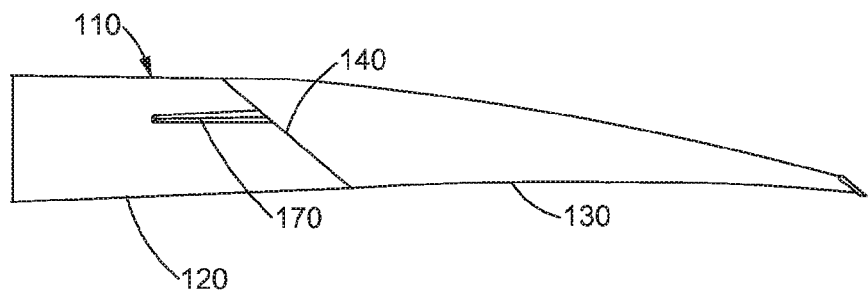
FIG. 1 is an illustration of a wing with a fold wing tip in an extended position.
Figure 2:
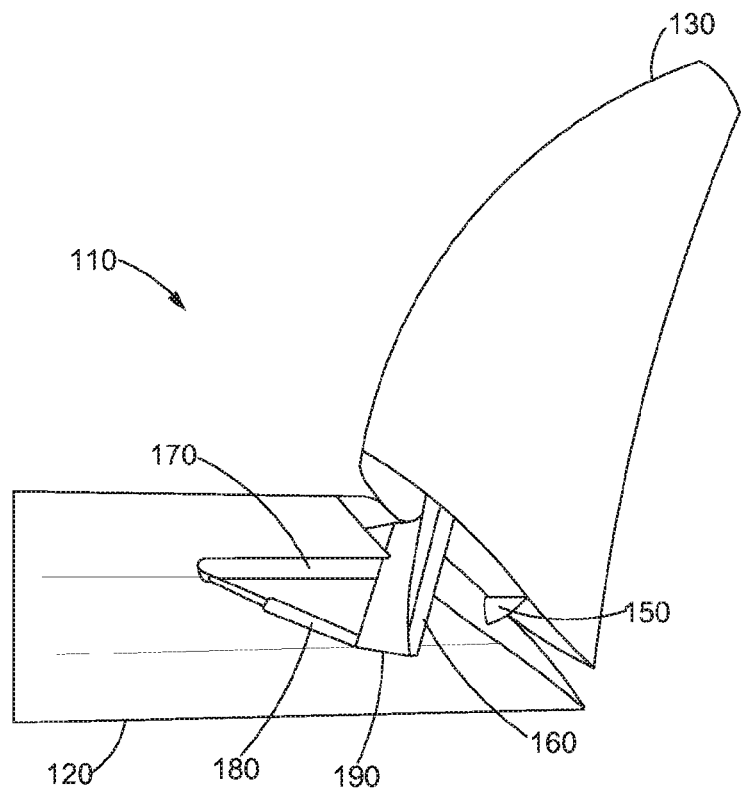
FIG. 2 is an illustration of the wing with the wing tip in a folded position.

Reference is made to FIGS. 1 and 2, which illustrate an aircraft wing 110. The wing 110 includes upper and lower skin panels, a stiffening substructure (e.g., ribs, spars), and leading and trailing edges. The wing 110 may also include one or more control surfaces (e.g., aileron, flap).

The wing 110 is divided into a main wing section 120 and a wing tip 130. The wing tip 130 is hinged to the main wing section 120 and is foldable about a hinge line 140. The wing tip 130 is movable between a folded position and an extended position.

FIG. 1 shows the lower surface of the wing 110, with the wing tip 130 in the extended position. In the extended position, the wing tip 130 is aligned with the main wing section 120.

FIG. 2 shows the wing tip 130 in the folded position. In some embodiments, a folded wing tip 130 may be roughly vertical to minimize ground area. In other embodiments, a folded wing tip 130 may be folded back onto the main wing section 120.

The wing 110 includes hinges 150 for allowing the wing tip 130 to fold about the upper surface of the main wing section 120. The wing tip 130 further includes at least one stub spar 160. Each stub spar 160 extends from an end of the wing tip 130. Each stub spar 160 is part of the wing tip 130 and rotates with the wing tip 130.

A single stub spar 160 is shown in FIG. 2. When the wing tip 130 is folded to the folded position, that stub spar 160 is roughly vertical (as shown in FIG. 2). As the wing tip 130 is being folded towards the extended position, that stub spar 160 enters into the main wing section 120 via a stub spar door 170. When the wing tip 130 reaches the extended position, that stub spar 160 is aligned with at least one of the spars in the main wing section 120.

The wing tip 130 may be folded by applying force to a free end of the stub spar 160. The force may be generated by an actuator (not shown) and transmitted to the stub spar 160 via a rod 180.

A locking pin receptacle 190 is located at a free end of the stub spar 160. The receptacle 190 receives a locking pin when the wing tip is in the extended position The locking pin locks the stub spar 160 to an aligned spar in the main wing section.

The stub spar 160 is essentially a beam. Cross-section of the beam is not limited to any particular type. Examples of beams for the stub spar 160 include, but are not limited to, I-beams, C-channels, Z-channels, and box beams.

Composition of the beam is not limited to any particular type. Examples of compositions include composite and metal (e.g., aluminum, titanium). A composite stub spar may be molded. A metal stub spar may be machined or built up.

Figure 3A:
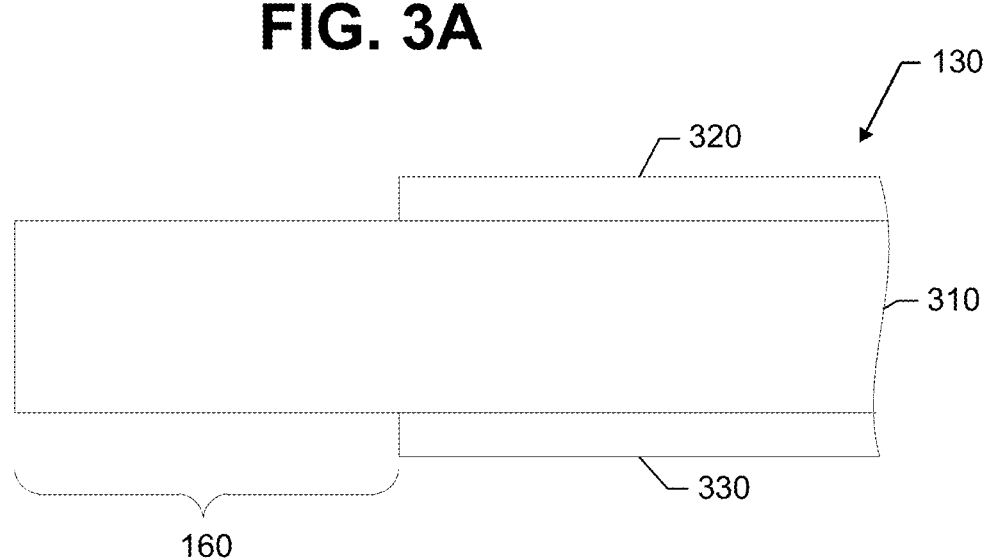
FIGS. 3A and 3B are illustrations of different types of constructions of a stub spar.
Figure 3B:
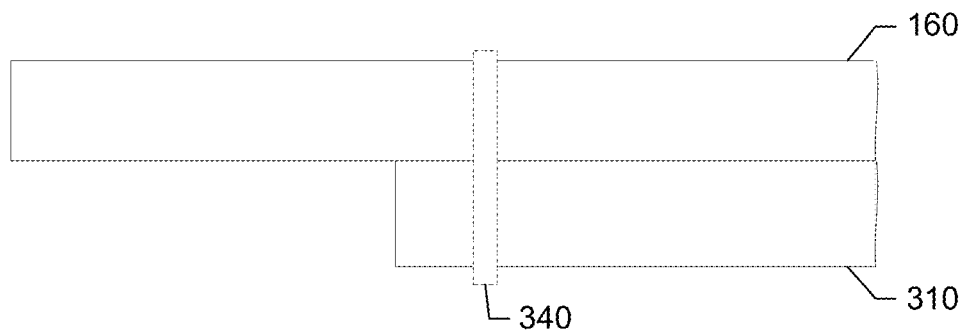

The stub spar 160 may be made part of the wing tip 130 in various ways. FIGS. 3A and 3B illustrates two examples. (In these two examples, the stub spar 160 is shown generically as a beam having a rectangular cross-section.)

In FIG. 3A, the sub spar 160 is simply an extension of a spar 310 in the wing tip 130. The wing tip spar 310 extends between upper and lower skin panels 320 and 330 of the wing tip 130.

In FIG. 3B, the stub spar 160 extends alongside a spar 310 in the wing tip 130. The stub spar 160 is attached to the wing tip spar 310 by fasteners 340 such as bolts.

Figure 4:
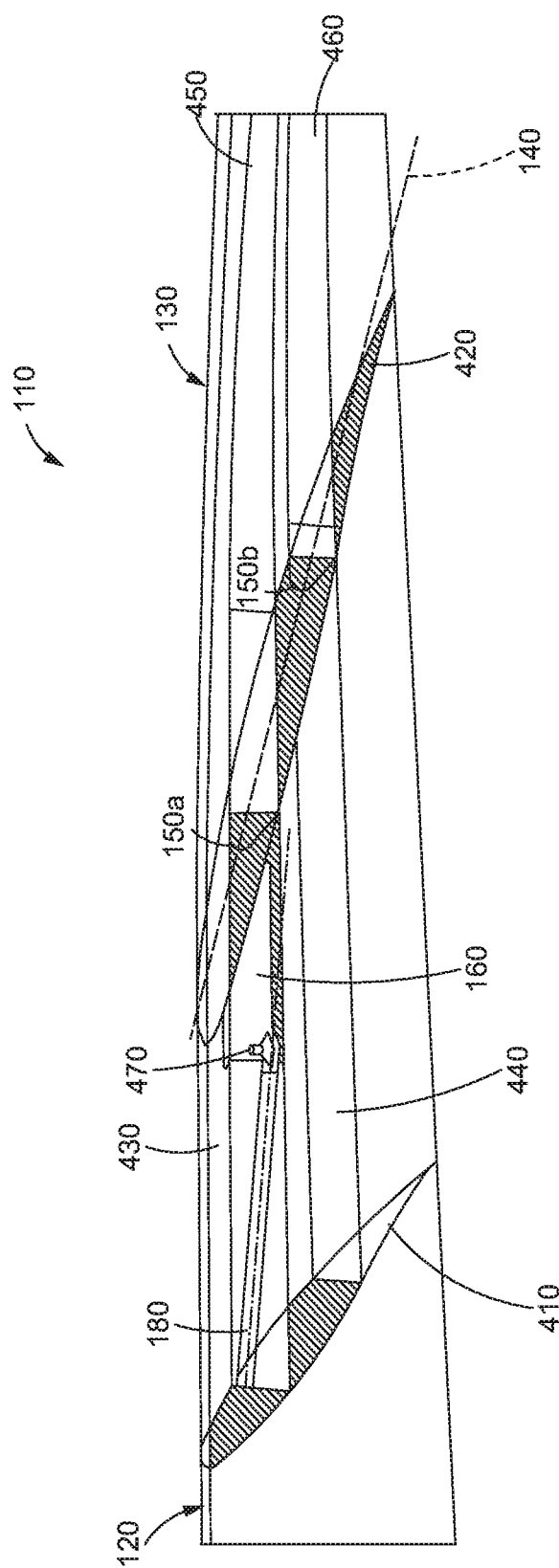
FIG. 4 is an illustration of a stub spar in relation to the wing tip and a main section of the wing when the wing tip is extended.

Reference is now made to FIG. 4, which illustrates the stub spar 160 in relation to the wing tip 130 and the main wing section 120 when the wing tip 130 is extended. The main wing section 120 includes a wing rib 410 and an end rib 420, and front and rear main spars 430 and 440. The end rib 420 is discontinuous at the front main spar 430 so the stub spar 160 can be moved into alignment with the front main spar 430 and locked to the front main spar 430.

The wing tip 130 includes front and rear spars 450 and 460. The stub spar 160 extends past the hinge line 140. In this example, the stub spar 160 is fastened to the tip front spar 440. The wing tip 130 further includes an end rib, which is also referenced by numeral 420. The tip end rib 420 may delineate the end of the wing tip 130.

The stub spar 160 may be locked to the front main spar 430 by a locking pin 470. The locking pin 470 may be moved by an actuator (not shown) though holes in the spars 160 and 430 to lock and unlock the wing tip 130.

The wing tip 130 is hinged to the main wing section 120 by a stub spar hinge 150a and a rear spar hinge 150b. The stub spar hinge 150a may be bolted to the front spar 430 and upper tip skin panel. The rear hinge 150b may be bolted to rear main spar 440 and the upper tip skin panel.

Figure 5:
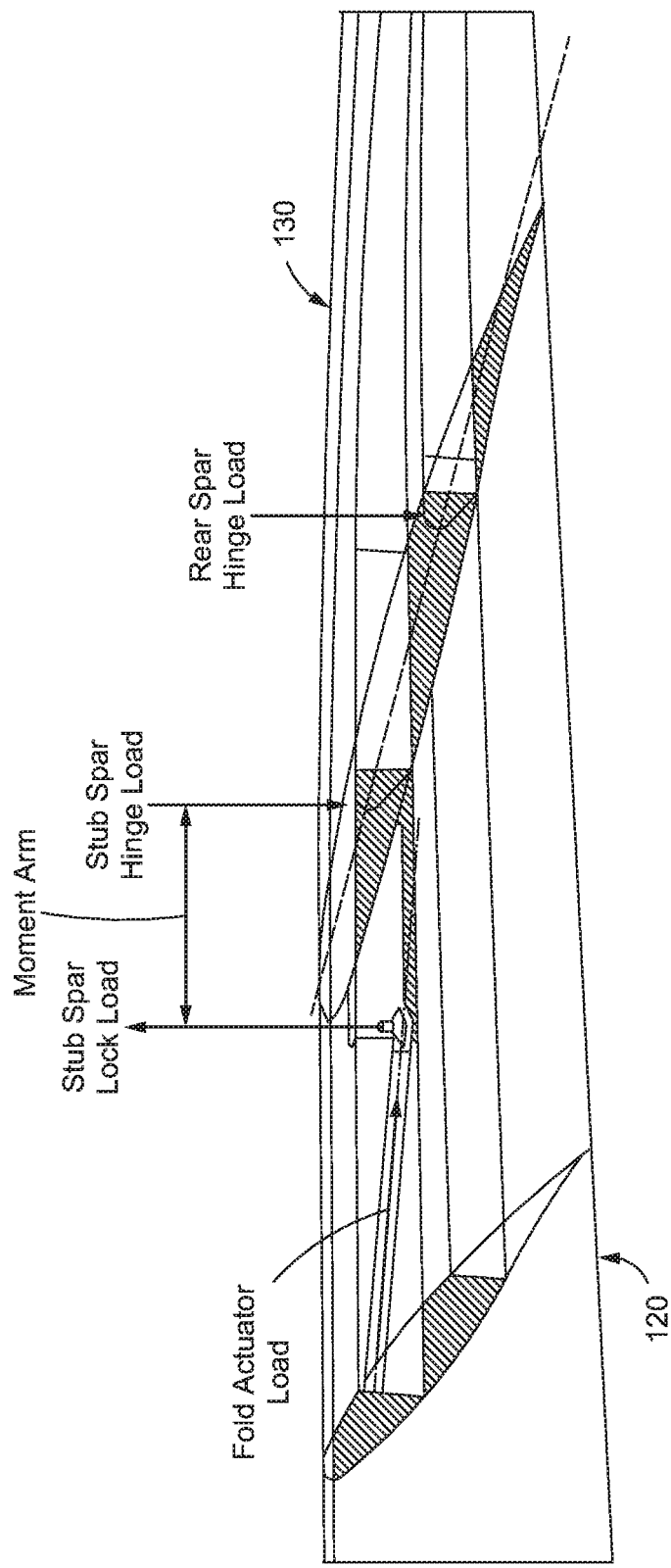
FIG. 5 is an illustration of wing joint loads when the wing tip is extended and locked.

Reference is now made to FIG. 5, which illustrates wing joint loads when the wing tip is extended and locked. The joint loads include a fold actuator load and a rear spar hinge load.

The joint loads further include a stub spar lock load and a stub spar hinge load. The distance between these two loads is the moment arm. The stub spar 160 is aligned with the front main spar 430 so the moment reaction is taken by the locking pin 470 and the stub spar hinge 150a along the length of the stub spar 160.

The stub spar 160 redirects the moment arm (along the main wing section 120) and provides a longer moment arm than a conventional design. In a conventional design, the moment arm is taken across the distance between wing surfaces (that is, the short height of the wing thickness). In an aircraft wing herein, the moment arm is taken along the length of the stub spar 160. In some embodiments, the stub spar 160 may extend between 12" and 36" beyond the tip end. In general, the length of the stub spar 160 is greater than the distance between wing surfaces.

The longer moment arm reduces reacting forces on the locking pin 470 and hinges 150a and 150b. This enables smaller, lighter hinges and locking pins to be used. It also enables the hinges 150a and 150b to be mounted between skin panels. Because the hinges 150a and 150b are not external, either drag is reduced or a fairing is not needed to reduce drag.

A wing herein is not limited to a single stub spar. Multiple stub spars may be used to reduce the load in the locking pins and also to provide redundancy.

In some embodiments of a wing herein, the stub spar is part of the main wing section and extends into the extended wing tip.

A wing herein may have a long high aspect ratio, yet still be used in existing airports. The higher aspect ratio enables higher aerodynamic efficiency without incurring penalties from increased weight or drag.

Figure 6:
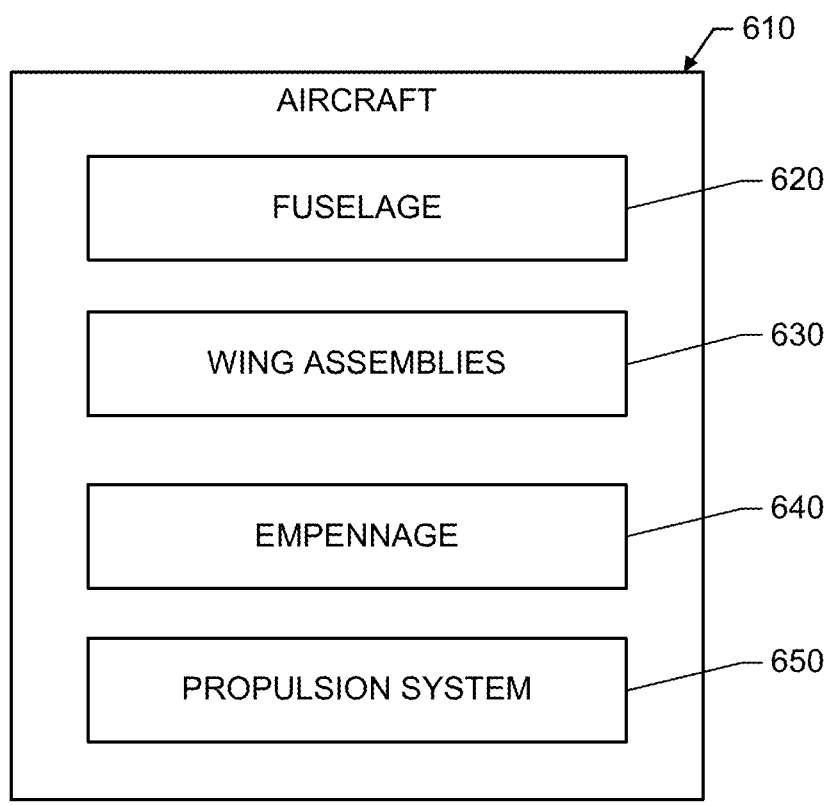
FIG. 6 is an illustration of an aircraft including folding structures.

FIG. 6 is an illustration of an aircraft. The aircraft 610 generally includes a fuselage 620, wing assemblies 630, and empennage 640. One or more propulsion units 650 are coupled to the fuselage 620, wing assemblies 630 or other portions of the aircraft 610. In some embodiments, the wing assemblies 630 include fold wing tips.

Other structures in the aircraft 610 may use folding structures herein. In some embodiments of the aircraft 610, the wing assemblies 630 may include wings that fold. In other embodiments, the tail may fold.

A folding structure herein is not even limited to aircraft. For instance, a folding structure herein may be applied to helicopter blades, wind generator turbine blades, truck tailgates, folding ramps, robotic arms, etc.

The invention claimed is:

1. An aircraft wing defining a chordwise direction, the wing comprising:
    a main wing section;
    a wing tip rotatably coupled to the main wing section by a hinge defining a hinge line extending in the chordwise direction and about which the wing tip rotates relative to the main wing section, the wing tip being movable between an extended position, in which the wing tip is aligned with the main wing section, and a folded position, in which the wing tip is rotated about the hinge line, the wing tip further including a stub spar extending past an end of the wing tip and configured for insertion into the main wing section when the wing tip is in the extended position, a free end of the stub spar defining a locking location configured for coupling to the main wing section, wherein a distance along a length of the stub spar between the hinge line and the locking location defines a moment arm for reacting a moment load across a length of the stub spar when the wing tip is extended and locked to the main wing section; and
    an actuator attached directly to the free end of the stub spar and configured to rotate the wing tip about the hinge line.

2. The wing of claim 1, wherein the stub spar includes a beam, and the hinge comprises a stub spar hinge directly attached to the beam.

3. The wing of claim 2, wherein the stub spar hinge is located beneath an upper surface of the main wing section.

4. The wing of claim 1, wherein the stub spar is aligned with a main wing spar when the wing tip is in the extended position; and wherein the stub spar is roughly normal to the main wing section when the wing tip is in the folded position.

5. The wing of claim 4, further comprising a locking device at the locking location of the stub spar for locking the stub spar to the main wing spar.

6. The wing of claim 1, wherein the distance between the hinge line and the locking location is greater than a distance between an upper surface and a lower surface of the wing tip.

7. The wing of claim 1, wherein the stub spar is an extension of a spar in the wing tip.

8. The wing of claim 1, wherein the stub spar is fastened to a spar in the wing tip.

9. The wing of claim 1, wherein the stub spar is subject to a stub spar lock load and a stub spar hinge load at different locations along a length of the stub spar.

10. An aircraft wing, the wing comprising:
    a main wing section defining a chordwise direction and including a main spar;
    a hinge coupled to the main spar and defining a hinge line extending in the chordwise direction;
    a wing tip including a stub spar extending past an end of the wing tip and attached to the hinge at a first location of the stub spar, so that the wing tip rotates relative to the main wing section about the hinge line between an extended position, in which the wing tip is aligned with the main wing section and the stub spar is aligned with the main spar, and a folded position, in which the wing tip is rotated about the hinge line, the stub spar configured for insertion into the main wing section when the wing tip is in the extended position, a free end of the stub spar defining a locking device positioned at a second location of the stub spar and configured to releasably engage the main spar of the main wing section, wherein a distance along a length of the stub spar between the first location and the second location defines a moment arm for reacting a moment load across a length of the stub spar when the wing tip is extended and locked to the main wing section, and wherein the distance along the length of the stub spar between the first location and the second location is greater than a distance between an upper surface and a lower surface of the wing tip; and an actuator operably coupled to the wing tip to fold the wing tip about the hinge line.

11. The wing of claim 10, wherein the hinge is located beneath an upper surface of the main wing section.

12. The wing of claim 10, wherein the stub spar is an extension of a spar in the wing tip.

13. The wing of claim 10, wherein the stub spar is fastened to a spar in the wing tip.

* * * * *